United States Patent
O'Mahony

(10) Patent No.: US 7,590,124 B2
(45) Date of Patent: Sep. 15, 2009

(54) ENCAPSULATION TECHNIQUE

(75) Inventor: Barry A. O'Mahony, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 10/676,279

(22) Filed: Sep. 30, 2003

(65) Prior Publication Data
US 2005/0071517 A1    Mar. 31, 2005

(51) Int. Cl.
*H04L 12/28* (2006.01)
*H04L 12/56* (2006.01)

(52) U.S. Cl. .................................... 370/395.64

(58) Field of Classification Search ......... 370/395–398, 370/466, 474, 337, 442, 347, 401, 420, 436, 370/282, 486, 231, 423, 218, 313, 329, 431, 370/336, 328, 324, 461, 389, 503, 430; 398/74; 725/109, 119; 710/1; 455/435, 434, 515; 709/236, 230, 231, 249, 232, 200; 348/426.1, 348/523, 462, 466, 467, 559, 560, 565; 375/222, 375/224, 326, 343, 240, 244, 329, 336, 249, 375/295, 377; 714/748, 758, 785; 340/7.38, 340/825.2
See application file for complete search history.

(56) References Cited

U.S. PATENT DOCUMENTS

| | | | | |
|---|---|---|---|---|
| 5,247,519 A * | 9/1993 | Snowden et al. ............ 370/313 |
| 5,703,877 A * | 12/1997 | Nuber et al. ............ 370/395.64 |
| 5,754,764 A * | 5/1998 | Davis et al. .................. 709/200 |
| 5,909,468 A * | 6/1999 | Lawrence .................... 375/295 |
| 5,936,967 A * | 8/1999 | Baldwin et al. ............. 370/474 |
| 6,144,653 A * | 11/2000 | Persson et al. .............. 370/337 |
| 6,295,094 B1 * | 9/2001 | Cuccia ........................ 348/559 |
| 6,373,848 B1 * | 4/2002 | Allison et al. ............... 370/401 |
| 6,449,288 B1 * | 9/2002 | Chari et al. .................. 370/470 |
| 7,085,229 B1 * | 8/2006 | Potter et al. .................. 370/231 |
| 7,194,001 B2 * | 3/2007 | Leatherbury et al. ... 370/395.64 |
| 7,310,306 B1 * | 12/2007 | Cheriton ...................... 370/218 |
| 2002/0034189 A1 * | 3/2002 | Haddock et al. ............. 370/423 |
| 2002/0136231 A1 * | 9/2002 | Leatherbury et al. ........ 370/442 |
| 2003/0188026 A1 * | 10/2003 | Denton et al. ............... 709/249 |
| 2003/0219015 A1 * | 11/2003 | Constant Six et al. ........ 370/389 |
| 2004/0101046 A1 * | 5/2004 | Yang et al. ............. 375/240.08 |

OTHER PUBLICATIONS

"Part 3: Carrier Sense Multiple Access with Collision Detection (CSMA/CD) Access Method and Physical Layer Specifications: 49. Physical Coding Sublayer (PCS) for 64B/66B, type 10GBASE-R," IEEE Std. 802.3ae-2002, Aug. 30, 2002, pp. 1-2, 317-345, Published by The Institute of Electrical and Electronics Engineers, Inc., New York, USA.

* cited by examiner

*Primary Examiner*—Wing F Chan
*Assistant Examiner*—Prenell P Jones
(74) *Attorney, Agent, or Firm*—Kacvinsky LLC

(57) ABSTRACT

Various techniques for encapsulation are described. A variable length frame is encapsulated into at least one fixed length codeword. The at least one fixed length codeword comprises an integer number of bytes. A first byte of the at least one fixed length codeword is a synchronization byte.

16 Claims, 5 Drawing Sheets

ENCAPSULATION TECHNIQUE

BACKGROUND INFORMATION

Current encapsulation techniques may be inflexible and inefficient. Therefore, a need may exist for an improved technique for encapsulating data.

DETAILED DESCRIPTION

Figure 1:
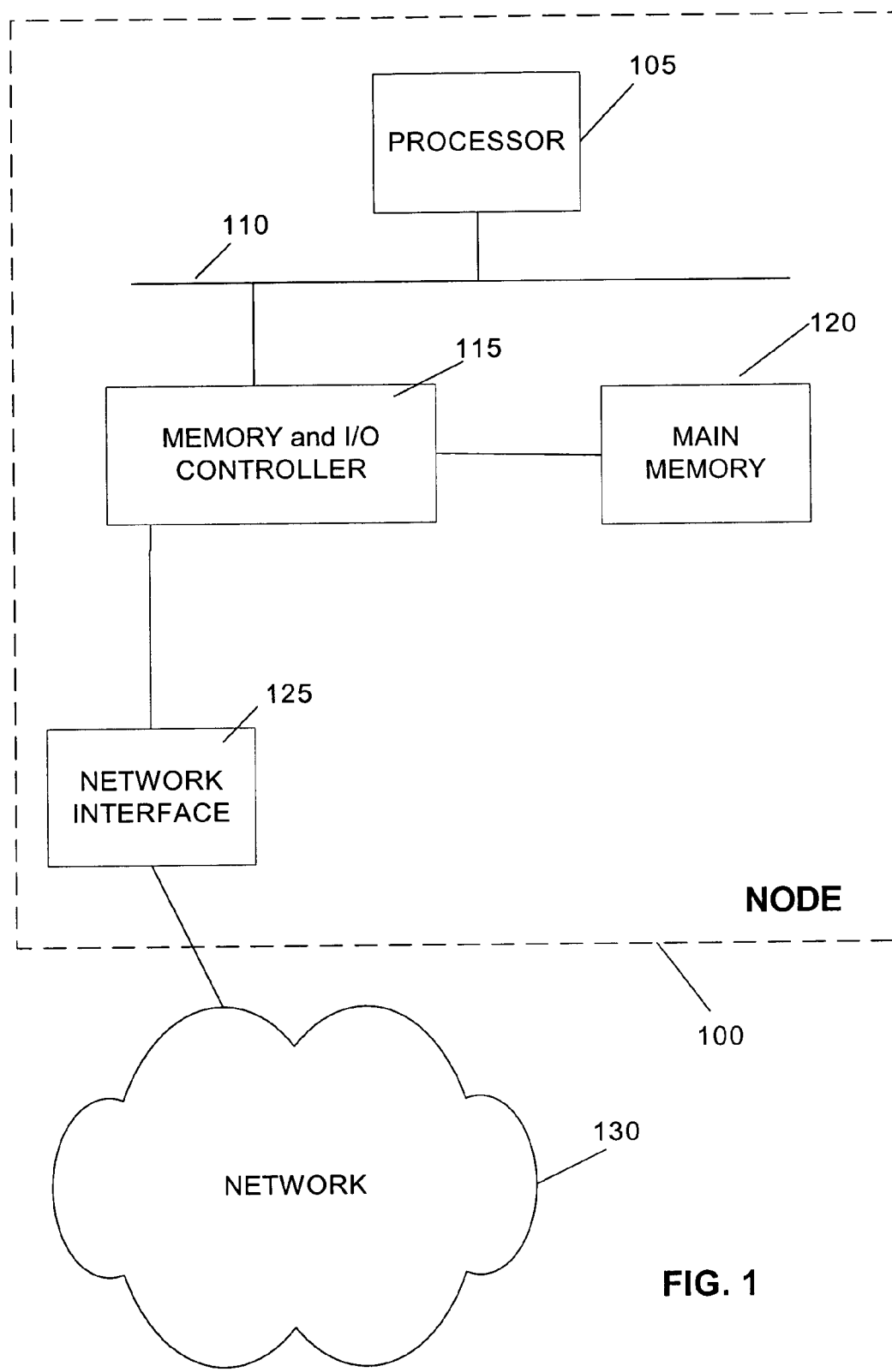
FIG. 1 is a diagram illustrating a node according to an example embodiment.

In the detailed description, numerous specific details are set forth in order to provide a thorough understanding of the embodiments of the invention. It will be understood by those skilled in the art, however, that embodiments of the invention may be practiced without these specific details. In other instances, well-known methods, procedures and techniques have not been described in detail so as not to obscure the foregoing embodiments.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

It should be understood that embodiments of the present invention may be used in a variety of applications. Although the present invention is not limited in this respect, the circuits and techniques disclosed herein may be used in many apparatuses, including a variety of nodes. A node, for example, may be any computing system, although the invention is not limited thereto. By way of example, a node may include a computer, a server, a bridge, a router, a switch, a wireless node such as a personal digital assistant (PDA), a cellular phone, a wireless node as part of an Institute of Electrical and Electronics Engineers (IEEE) 802.11 wireless LAN (WLAN) such as an 802.11 WLAN mobile or an 802.11 access point (AP).

A node may also comprise a modem, network interface controller and other devices to interface with a network, such as a telephone line (e.g., copper twisted pair lines), a digital subscriber line (DSL), an IEEE 802.3 Ethernet network, a local area network (LAN), an Asynchronous Transfer Mode (ATM) network, Internet Protocol (IP) network, a cable network, and the like. The nodes may communicate over a variety of media, such as copper twisted pair lines or conductors, coaxial cable, fiber optic lines, wireless channels, etc. In an example embodiment, the circuits and techniques described herein may be provided within a cable modem, a DSL modem, an Ethernet network interface controller (NIC), and the like.

As used herein, the term packet may include a unit of data that may be routed or transmitted between nodes or stations or across a network. As used herein, the term packet may include frames, protocol data units or other units of data. A packet may include a group of bits, which may include one or more address fields, control fields and data, for example. The terms "frame" and "packet" may be used interchangeably.

Referring to the Figures in which like numerals indicate like elements, FIG. 1 is a diagram illustrating a node according to an example embodiment. In this illustrative embodiment, a node 100 may include, for example, a processor 105 to execute instructions and software. The processor may be coupled to a memory and input/output (I/O) controller 115 via a host bus 110. Memory and I/O controller may control main memory 120 and may control a variety of different I/O interfaces. A network interface 125 is coupled to the memory and I/O controller 115 to interface node 100 to a network 130.

Figure 2:
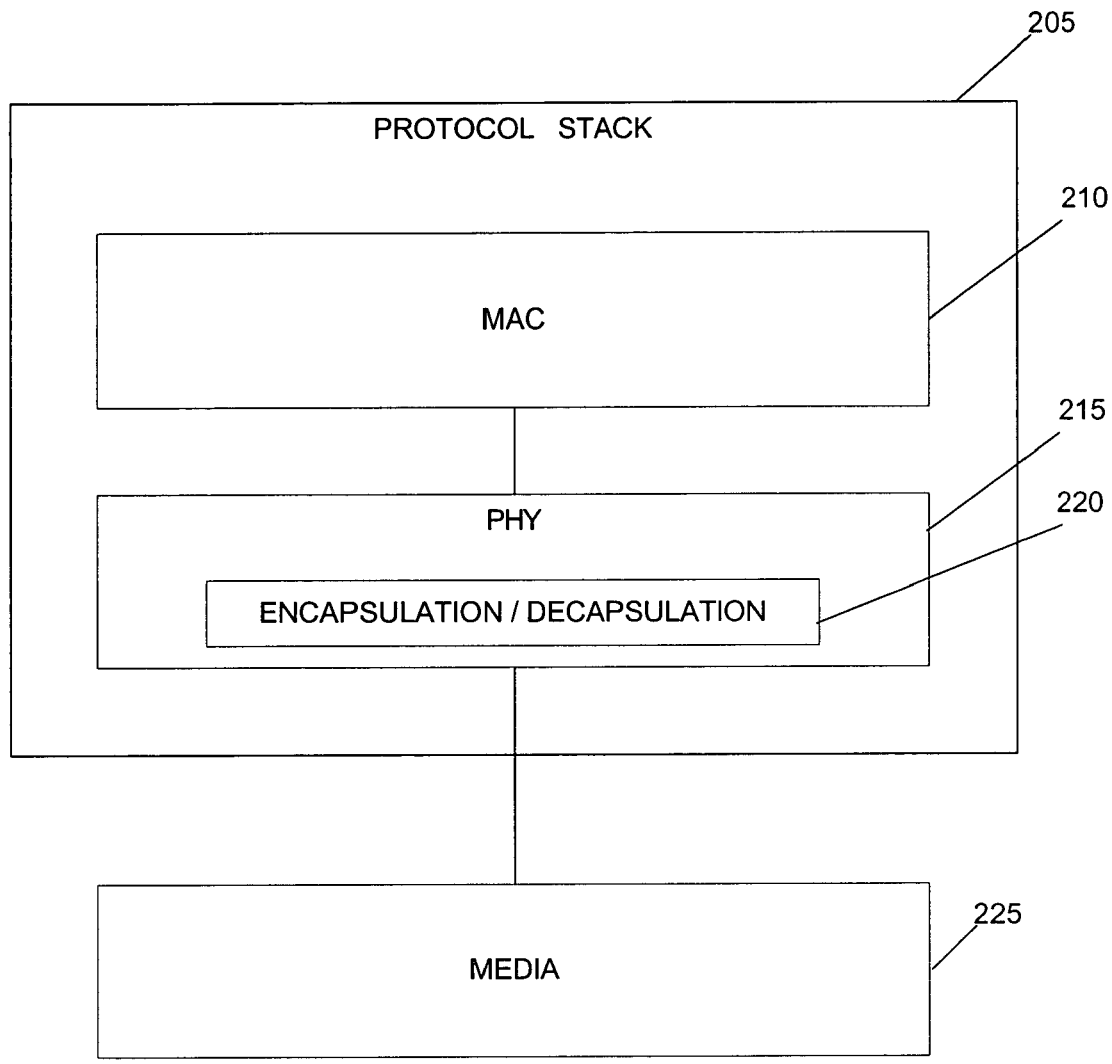
FIG. 2 is a diagram illustrating a protocol stack according to an example embodiment.

FIG. 2 is a diagram illustrating a protocol stack according to an example embodiment. Protocol stack 205 may perform a number of protocol related tasks. Protocol stack 205 may be implemented, for example, in hardware, software or a combination of hardware and software. Protocol stack 205 may be implemented, for example, as part of network interface 125, as software executed on processor 105 (or other processor), or as a combination of network interface 125 and in software executed by processor 105, although the invention is not limited thereto.

Protocol stack 205 may include a media access control (MAC) layer 210 to perform tasks related to media access control, such as, for example, carrier sense multiple access/collision detection (CSMA/CD) or other MAC related tasks, although the invention is not limited thereto. A physical layer (PHY) 215 may be coupled to MAC layer 210 to provide a physical layer interface. A physical media 225 is coupled to PHY 215, and may include, for example, copper lines, twisted pair wires, coaxial cable, fiber optic lines, wireless, or any other media.

PHY 215 may include an encapsulation layer 220 to encapsulate frames or packets into codewords for transmission over media 225 (such as network 130 for example), and may unencapsulate (or decapsulate) codewords that have been received via media 225 back into frames or packets. In an example embodiment, encapsulation layer 220 may encapsulate one or more Ethernet MAC frame (or other data fragment) into one or more codewords. In an example embodiment, encapsulation layer 220 may encapsulate Ethernet MAC frames into one or more fixed length codewords, which may be 65 bytes (or octets) in length for example. While an encapusulation of an Ethernet MAC frame may be described herein as an example, the invention is not limited thereto, and may be applied to the encapsulation of a wide variety of packets, frames, data units, data fragments, etc.

A format of an Ethernet MAC frame is shown below, and may include a preamble, a start frame delimiter (SFD), destination address, source address, type (LIT), data and a frame check sequence (FCS).

Figure 3:
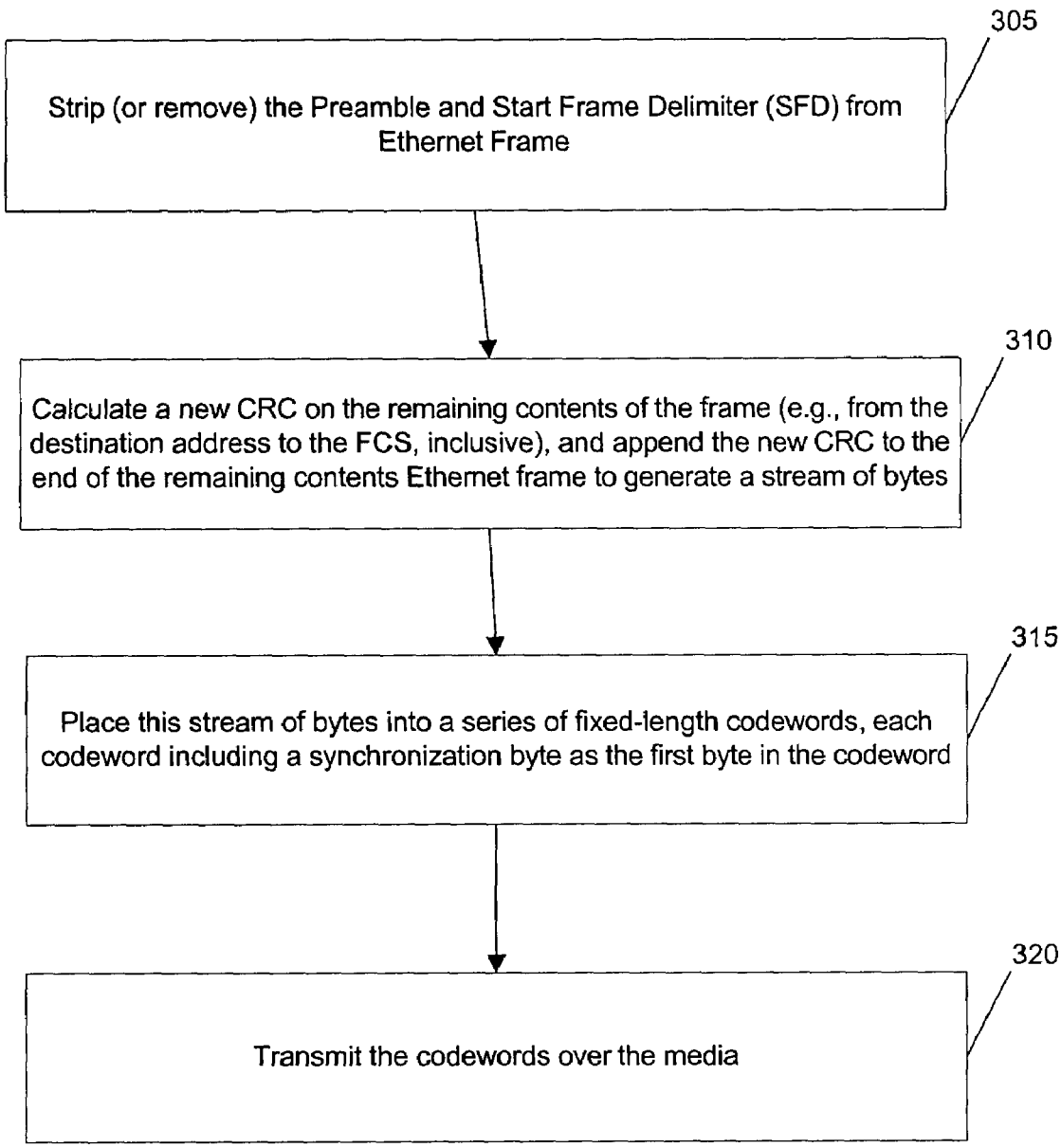
FIG. 3 is a flowchart illustrating operation of an encapsulation layer according to an example embodiment.

FIG. 3 is a flowchart illustrating operation of an encapsulation layer 220 to encapsulate a frame into a series of codewords according to an example embodiment. Referring to FIG. 3, at 305, the preamble and start frame delimiter (SFD) are stripped or removed from the Ethernet frame. As these are constant in value, there is no need to transfer them across the link. At the receiver (decapsulation), the preamble and the SFD for the Ethernet frame may be reconstructed (due to a known constant value) and appended prior to delivery of the frame to the MAC layer.

At 310, a new cyclic redundancy check (CRC), in addition to the existing Ethernet frame check sequence (FCS), is computed on the remaining contents of the frame, from the destination address to the FCS, inclusive, according to an example embodiment, although the invention is not limited thereto. This may result in a stream of bytes (including the remaining portion of the Ethernet frame and the new CRC). Blocks 305 and 310 are optional. In an example embodiment, a 32-bit CRC may be calculated using the following polynomial, although the invention is not limited thereto:

$$x^{32}+x^{28}+x^{27}+x^{26}+x^{25}+x^{23}+x^{22}+x^{20}+x^{19}+x^{18}+x^{14}+x^{13}+x^{11}+x^{10}+x^{9}+x^{8}+x^{6}+1.$$

At 315, this stream of bytes is placed into a series of codewords, which, according to an example embodiment, may be fixed-length codewords. According to an example embodiment, each of the codewords may include an integral number (e.g., a whole number) of bytes. In an example embodiment, the fixed-length codewords may be 65 bytes in length. At 320, the codewords may be transmitted by PHY 215 via the media 225.

Table 1 below shows the various codeword formats according to an example embodiment, although the invention is not limited thereto. In the codeword formats in table 1, D may indicate a data character, Z may indicate an idle character (sometimes referred to as a null character), $C_k$ may identify the number of data byes (or octets) in the codeword until end of the current frame, and S may be a start-of-frame marker (e.g., indicating a start of a new Ethernet frame that is being encapsulated into codewords). Z may be chosen to be a particular value, such as $00_{16}$, for example, or other value. In an example embodiment, between two consecutive frames (e.g., between two consecutive Ethernet frames), there may be one or more Z (idle) characters followed by an S (start-of-frame marker).

| Ethernet MAC Frame | | | | | | |
|---|---|---|---|---|---|---|
| 7 octets | 1 octet | 6 octets | 6 octets | 2 octets | 46-1500 octets | 4 octets |
| Preamble | SFD | Dest. Address | Source Address | L/T | MAC Client Data | FCS |

TABLE 1

Codeword Formats

| Type | Frame Data | Sync Byte | Byte Fields 1–64 | | | | | | | | | |
|---|---|---|---|---|---|---|---|---|---|---|---|---|
| 1) all data | DDDD---DDDD | $0F_{16}$ | $D_0$ | $D_1$ | $D_2$ | $D_3$ | $D_4$ | $D_5$ | ... | $D_{61}$ | $D_{62}$ | $D_{63}$ |
| 2) end of frame | Contains k D's, where k = 0 to 63 | $F0_{16}$ | $C_k$ | $D_0$ | $D_1$ | $D_2$ | $D_3$ | ... | $D_{k-1}$ | Z | ... | Z |
| 3) all idle | ZZZZ---ZZZZ | $F0_{16}$ | Z | Z | Z | Z | Z | Z | ... | Z | Z | Z |
| 4) start of frame while idle | Contains k D's, k = 0 to 63, and contains j Z's, where j = 63 - k | $F0_{16}$ | Z | Z | Z | S | $D_0$ | $D_1$ | ... | $D_{k-3}$ | $D_{k-2}$ | $D_{k-1}$ |
| 5) start of frame while transmitting data | Contains last k D's of $1^{st}$ frame, k = 0 to 62, and contains first j D's of $2^{nd}$ frame, j = 0 to 62 - k | $F0_{16}$ | $C_k$ | $D_0$ | ... | $D_{k-1}$ | Z | ... | S | $D_0$ | ... | $D_{j-1}$ |

According to an example embodiment, there may be five different types of codewords, although the invention is not limited thereto. Each codeword may include a one-byte synchronization (sync) byte, plus some additional characters as described below. In an example embodiment, the sync byte may be one of two values: $0F_{16}$ or $F0_{16}$, although the invention is not limited thereto. In an example embodiment, the sync byte may be 0F for the all data codeword, and F0 for the other codewords, although the invention is not limited thereto. Each of the five types of codewords will be briefly described, according to example embodiments:

Codeword 1) (the all data codeword) may include all data characters D (in addition to the sync byte), and all of the data characters in the codeword may belong to the same Ethernet Frame.

Codeword 2) (the end of frame codeword): up to 63 bytes in the codeword may belong to the same frame, and the rest of the codeword, if any, may include idle characters. This codeword may be used when frame data ends in the middle of a codeword. The last k bytes (data characters) of the Frame are sent in the codeword (with the last 4 bytes of these k bytes include the newly added CRC described above), with the remaining 63-k characters being the idle character Z, according to an example embodiment.

Codeword 3) (all idle codeword) may include all idle characters Z (in addition to the sync byte). This codeword may be used when there is no valid frame data (e.g., Ethernet frame data) to be sent.

Two start of frame codewords will now be described. According to an example embodiment, a start-of-frame marker (e.g., start of a new Ethernet frame) is not limited to a specific location(s) within a codeword, such as at the beginning of a codeword, etc. Rather, according to an example embodiment, a start-of-frame marker may occur at any time after the conclusion of the previous frame, e.g., any time the Z character is being sent. Therefore, a start-of-frame may occur at any location within a codeword after the sync byte. According to an example embodiment, the start-of-frame (beginning of a new Ethernet frame to be encapsulated) may occur anywhere, such as at the beginning of a codeword, middle of a codeword, or any other location within a codeword (other than the first byte which may be reserved for a sync byte). This may provide a more flexible and efficient encapsulation technique because it is not necessary to provide a start-of-frame only at a predetermined location such as at the beginning of a codeword. This flexible approach for start-of-frame markers may be more efficient because it may avoid filling some portion of a codeword until some predetermined location. Rather, data of the new frame (e.g., start-of-frame marker followed by data bytes) may be transmitted immediately after the end of the previous frame (after inserting the sync byte).

Codeword 4) (start of frame while idle) may be used to start transmission of a new frame while idle characters are being sent. This frame may contain j idle characters (Z) followed by a start-of-frame marker (S) and k of the first data characters (D) of a frame.

Codeword 5) (start of frame while transmitting data) may be used to transmit the end of a first frame and then begin transmitting a next (a second) frame during the same codeword. According to an example embodiment, the start-of-frame marker (S), indicating a beginning of a new frame, may occur anywhere in a codeword after the sync byte. The start of frame while transmitting data may include: a sync byte, a $C_k$ byte (which is a control character) to identify the number of data bytes until end of the current or first frame, k data characters (D) of the first frame, zero or more idle characters (Z), a start-of-frame marker (S) indicating a start of a new or second frame, followed by j data characters of the second frame.

In an alternative embodiment, the data or bytes in the Ethernet frame (to be encapsulated) may be scrambled, for example, using a conventional self-synchronizing scrambler. Such a scrambler may enhance the ability of the receiver to lock onto codeword boundaries, as it may assist in reducing the occurrence of $0F_{16}$ and $F0_{16}$ byte values at regular locations, which may mimic valid sync fields, and thereby increase errors. In an example embodiment, a receiver (which may include a MAC and PHY as described above in FIG. 2) may acquire or detect a codeword boundary by detecting valid sync fields. The value of the sync byte (indicating start of codeword) and also (at least in one case) the control code $C_k$ indicating a number of data bytes in the first frame, may be used by the receiver to detect the data bytes in a codeword and thereby to unencapsulate or decapsulate the frames based on the received codeword(s).

Figure 4:
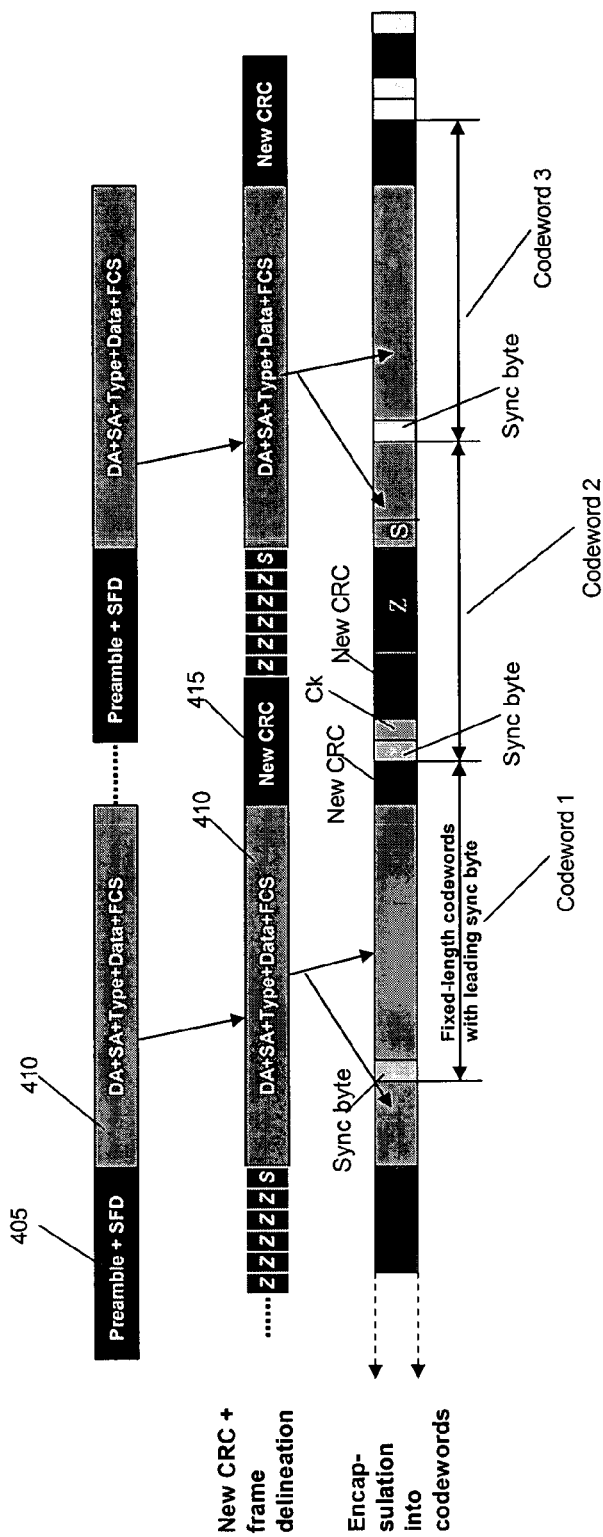
FIG. 4 is a diagram illustrating encapsulation of a frame according to an example embodiment.

FIG. 4 is a diagram illustrating encapsulation of a frame according to an example embodiment. Referring to FIG. 4, although not required, a preamble and SFD (start frame delimiter) section 405 are stripped or removed from a Ethernet MAC frame, leaving a remaining portion 410 (including destination and source addresses, type, data and Ethernet FCS). Next, a new CRC 415 is calculated and appended to the remaining Ethernet portion 410. This is done for other frames as well to generate a stream of bytes. These bytes are then encapsulated into a series of fixed length codewords.

An example encapsulation is shown in FIG. 4 (last Figure of FIG. 4). For example, codeword 1 may include a sync byte, followed by a data portion, and then part of the newly calculated CRC. Thus, codeword 1 may be an all data codeword. In this example, the way the codewords occur, the new CRC straddles two codewords (i.e., extending from the end of codeword 1 to the beginning of codeword 2).

Codeword 2 in FIG. 4 may be a start of frame while transmitting data codeword. Therefore, a sync byte and a $C_k$ control character are inserted as the first two bytes of codeword 2 (prior to the remaining portion of the new CRC). Codeword 2 includes a sync byte, a CK control character, the remaining portion of the CRC, some idle characters (Z), a start-of-frame marker (S), and data of a new Ethernet frame. Codeword 3 is an all data codeword and includes a sync byte, data characters, followed by a new CRC. These are merely some examples of encapsulation, and the invention is not limited thereto.

Figure 5:
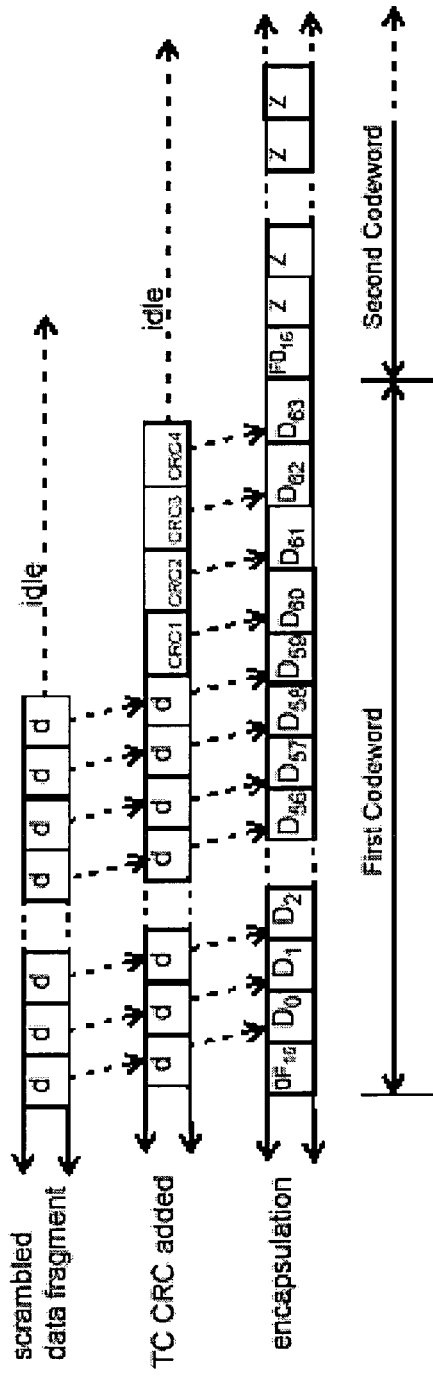
FIG. 5 illustrates additional examples of encapsulation according to an embodiment.
Figure 5:
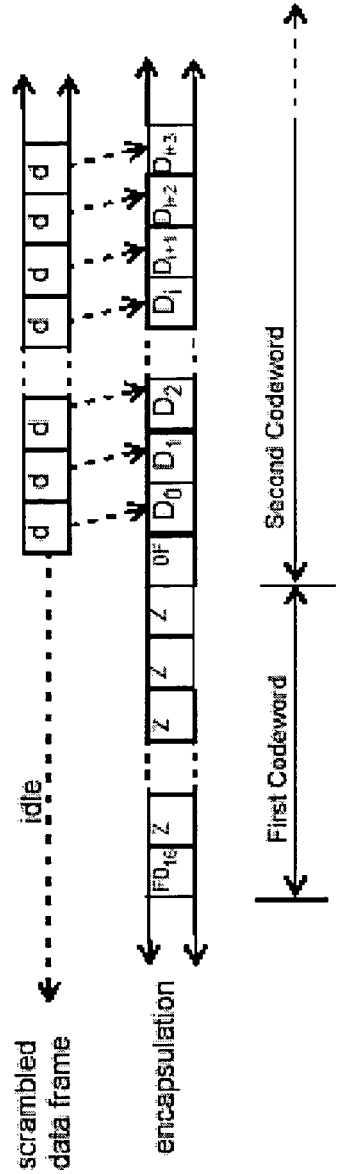

FIG. 5 illustrates additional examples of encapsulation according to an embodiment. In the first example in FIG. 5, a new CRC is calculated and added to the scrambled data bytes of the Ethernet frame (e.g., scrambled fragment). These bytes are then encapsulated into one or more codewords. The first codeword is an all data codeword where the last byte of the new CRC happens to become the last byte of the first codeword. The second codeword may be an all idle codeword. In the second example of FIG. 5, the first codeword is an all idle codeword. The first byte of the second frame is the first byte of an all data codeword.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    encapsulating a variable length frame into at least one fixed length codeword comprising an integer number of bytes, wherein a first byte of the codeword is a synchronization byte, the synchronization byte comprises one of two synchronization byte values including a first synchronization byte value indicating that the codeword is an all data codeword, and a second synchronization byte value indicating that the codeword is not an all data codeword;
    indicating the start of a new frame within a codeword using a start-of-frame marker, wherein the start-of-frame marker may be located anywhere within the codeword after the synchronization byte.

2. The method of claim 1 wherein if an end of a frame occurs within a codeword, then a position of the end of the frame within the codeword is indicated by a control byte that follows the synchronization byte.

3. The method of claim 1 and further comprising removing a preamble and a start frame delimiter of the frame leaving a remaining portion of the frame.

4. The method of claim 3 and further comprising calculating a new cyclic redundancy check (CRC) of a remaining portion of the frame.

5. The method of claim 4 and further comprising appending the new CRC to the remaining portion to provide a plurality of bytes to be encapsulated.

6. The method of claim 5 wherein said encapsulating comprises encapsulating the plurality of bytes into a plurality of the fixed length codewords.

7. The method of claim 1 wherein the codeword is one codeword selected from at least five different types of codewords.

8. The method of claim 1 wherein the codeword is a codeword selected from the group of codewords comprising:
    a) an all data codeword;
    b) an end of frame codeword;
    c) an all idle codeword; and
    d) a start of frame codeword.

9. The method of claim 1 wherein the start of frame codeword comprises one of the following codewords:
    1) a start of frame while idle codeword; and
    2) a start of frame while transmitting data codeword.

10. The method of claim 1 and further comprising transmitting the at least one codeword over a media.

11. The method of claim 1 wherein the at least one fixed length codeword is 65 bytes in length.

12. A method comprising:
    encapsulating a variable length frame into at least one fixed length codeword comprising an integer number of bytes, wherein a start of a new frame is indicated within the codeword by a start-of frame marker, wherein the start-of-frame marker may be located anywhere within the codeword after the first byte of the codeword, the first byte of the codeword is a synchronization byte, the synchronization byte comprises one of two synchronization byte values including a first synchronization byte value indicating that the codeword is an all data codeword, and a second synchronization byte value indicating that the codeword is not an all data codeword;
    indicating the start of a new frame within a codeword using a start-of-frame marker, wherein the start-of-frame marker may be located anywhere within the codeword after the synchronization byte.

13. The method of claim 12 wherein if an end of a frame occurs within a codeword, then a position of the end of the frame within the codeword is indicated by a control byte that follows the synchronization byte.

14. The method of claim 12 wherein the at least one fixed length codeword is 65 bytes in length.

15. A method comprising:
    removing a preamble and a start frame delimiter of a frame leaving a remaining portion of the frame;
    calculating a cyclic redundancy check (CRC) of a remaining portion of the frame;
    appending the CRC to the remaining portion to provide a plurality of bytes;
    placing the plurality of bytes into at least one fixed length codewords, each codeword comprising an integer number of bytes, wherein a first byte of the codeword is a synchronization byte, the synchronization byte comprises one of two synchronization byte values including a first synchronization byte value indicating that the codeword is an all data codeword, and a second synchronization byte value indicating that the codeword is not an all data codeword, wherein a start of a new frame is indicated within a codeword by a start-of-frame marker, wherein the start-of-frame marker may be located anywhere within the codeword after the synchronization byte.

16. The method of claim 15 wherein each of the codewords is selected from the group of codewords comprising:
    a) an all data codeword;
    b) an end of frame codeword;
    c) an all idle codeword; and
    d) a start of frame codeword.

* * * * *